April 1, 1930.  W. S. JONES  1,752,669
FISHING TOOL
Filed June 4, 1928
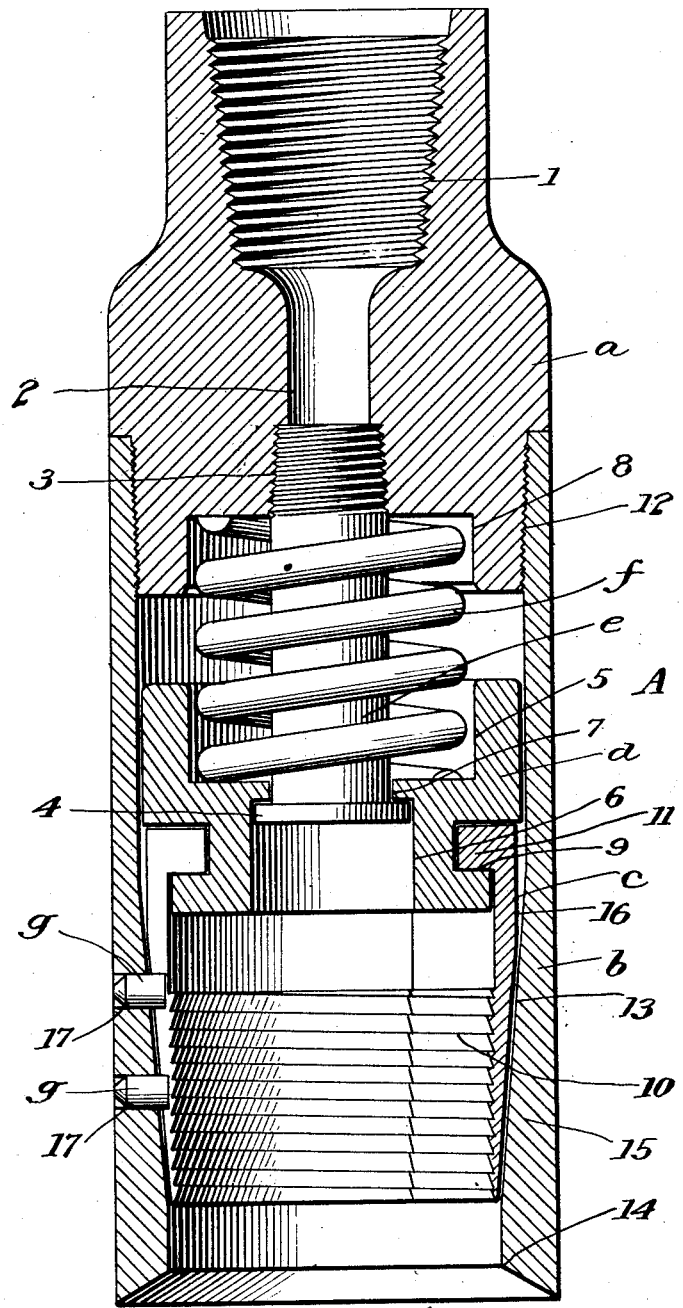
INVENTOR,
Winfield S. Jones;
BY
Blakeslee & Brown
ATTORNEYS.

Patented Apr. 1, 1930

1,752,669

UNITED STATES PATENT OFFICE

WINFIELD S. JONES, OF BREA, CALIFORNIA, ASSIGNOR OF FIFTY PER CENT TO ELMORE D. JONES, OF LONG BEACH, CALIFORNIA

FISHING TOOL

Application filed June 4, 1928. Serial No. 282,791.

This invention relates to fishing tools, and particularly to that class of fishing tool adapted to be associated with a rotary outfit. The invention contemplates a fishing tool so arranged and constructed that circulation therethrough is possible. The invention utilizes slips and the slips are mounted in a manner which permits their conjoint movement. Fishing tools, as far as the inventor is aware, that utilize slips are open to the objection that the slip members thereof do not move together or equally with the result that the said slips do not properly grab or secure an object.

The invention has for an object the provision of a fishing tool wherein the slip members thereof operate together to provide an even grip upon an object to be secured.

Another object is the provision of a fishing tool utilizing slips which may be readily disconnected from the gripped object if for any reason the object secured cannot be lifted without endangering the fishing tool and associated tubing.

Another object is the provision of a fishing tool which may be readily disconnected from the gripped object at the surface of the well.

Other objects will appear as the specification proceeds, among which objects are simplicity of structure, ease and adaptability of the device to existing conditions to be met, as well as general superiority.

With the above and other objects in view, the invention consists in the novel and useful provision, formation, construction, association, and relative arrangements of parts, members and features, all as shown in a certain embodiment in the accompanying drawings, described generally, and more particularly pointed out in the claims.

In the drawing:

The figure is a vertical elevation of the improved fishing tool.

Referring now with particularity to the drawing, the improved fishing tool is designated as an entirety by A, and the same includes a sub $a$, a bowl $b$ connected with the sub, slips $c$ carried upon a collar $d$, a circulation tube $e$ associated with the sub and the collar, a coil spring $f$ surrounding the circulation tube and lying between the collar $d$ and sub $a$, and keys $g$ for preventing rotation of the slips $c$, all of which elements are utilized in practicing one embodiment of the invention.

The sub $a$ is formed with a screw-threaded and tapered box 1 and is formed with a central opening 2 communicating with the box. The wall bounding said opening 2 is tapered and screw-threaded at 3, and the circulation tube $e$ is screw-threaded upon the threads 3. Said circulation tube is likewise provided with a flanged end 4. The collar $d$ is substantially annular in form and is provided with a curved recess 5. The central opening 6 of said collar is adapted to confine the flanged end 4 of the circulation tube and in such a manner that the collar may move relative to said flanged end of the circulation tube, the collar to this end being provided with an inwardly directed annular flange portion 7 for engagement depending upon collar position, with the flange 4, as illustrated in the drawing. The sub is formed with a circular recess or chamber portion 8 and adapted to surround the circulation tube is a coil spring $f$, ends of said coil spring being received within the chamber portions 5 and 8 of the collar and sub. The collar $d$ is provided with an annular groove 9.

The slips $c$, of which there may be one or more, are provided with internal teeth 10, and upper ends of said slips are provided with inwardly directed or flanged heads 11, which heads are adapted to be received within the groove 9 of the collar. It is perhaps unnecessary to state that these slips are curved, and the several slips, if more than one is used, cooperate to maintain an engaging means arranged in circular relation.

The sub $a$ is reduced in diameter and screw-threaded at 12, and the bowl $b$ is internally screw-threaded for engagement with the screw-threads of the sub at 12. The bowl is provided with a tapered inner wall 13. This bowl is provided with the usual mouth portion 14. The inclined wall 13 of the bowl is adapted to cooperate with the backs of the slips which are likewise inclined at 15 relative to the shanks 16 of said slips.

One or more keys $g$ may be provided for maintaining the slips against rotation, and this is conveniently done by providing one or more transverse openings 17 in the bowl, through which openings are passed the keys for engagement with one of the slips.

It is to be particularly noted that the teeth of the slips are arranged in a screw-threaded formation. In other words, the teeth do not lie in the same horizontal plane but are inclined relative to a horizontal plane passed through the axis of the slips. It is intended that if the teeth of the slip are arranged so that the incline given said teeth would correspond to a left hand thread, then the threads 1 and 3 of the sub and the threads 12 between the sub and the bowl should be right handed.

The operation, uses and advantages of the invention are as follows:

Assume that the fishing tool is connected with the usual tubing through the medium of a pin secured to the box 1. The device as an entirety is lowered within the well casing and when the object to be fished for is reached, the same will be directed inwardly of the mouth 14 and received between the slips $c$. In this connection, it will be evident that the slips may be pushed upwardly within the bowl which will allow them to expand outwardly and the slips would all move evenly relative to the object engaged due to the fact that said slips are interconnected and maintained in a definite formation through the medium of the collar $d$. The spring $f$ would be compressed and if the object engaged should strike one of the slips in a slanting relation due to the fact that all the slips move evenly when the actual securing of the object engaged was completed, all of the slips would engage said object. The moment that a lifting operation was made, the slips would move downwardly and the contact between the slips and the inclined wall of the bowl would close said slips upon the object and maintain said slips in tight engagement with the secured object. If for any reason it is impossible to lift the secured object, the fishing tool could be readily disengaged by turning the tubing to the right which, of course, due to the left hand cant given the teeth of the slips would permit the slips to literally unscrew from the secured object. The keys, of course, hold the slips to the bowl so that rotation of the fishing tool will, of course, cause rotation of the slips. On the other hand, if the fishing tool functions to lift the secured object to the surface of the well hole, said object upon reaching the well hole may be readily secured in the usual manner, whereupon the sub may be disconnected from the bowl, which would permit the bowl to drop and the device would thereby be disassembled and released from the secured object.

By permitting circulation through the fishing tool, it is possible to prevent the several parts thereof from becoming clogged and not working properly, and likewise provides a ready means whereby the object secured could possibly be loosened from any formation that was holding the same.

It is obvious that various changes, modifications and variations may be made in practicing the invention in departure from the particular showing of the drawing without departing from the true spirit of the invention.

Having thus disclosed my invention, what I claim and desire to secure by Letters Patent is:

1. In a fishing tool, a bowl, a sub connected therewith, an annular collar within the bowl, a circulation tube secured to the sub and carrying said collar when the collar is in one position, a coil spring surrounding the circulation tube and lying between the sub and the said collar, and slip members arranged in annular formation within said bowl and carried by the collar.

2. In a fishing tool, a bowl, a sub connected therewith, an annular collar within the bowl, a circulation tube secured to the sub and carrying said collar when the collar is in one position, a coil spring surrounding the circulation tube and lying between the sub and the said collar, slip members arranged in annular formation within said bowl and carried by the collar, and means between one of said slip members and the bowl for preventing rotation of said slips relative to the bowl.

3. In a fishing tool, an annular bowl, a sub connected therewith, an annular collar within said bowl, a circulation tube secured to the sub and carrying said collar when the collar is in one position, a coil spring surrounding the circulation tube and lying between the sub and the said collar; said collar being provided with an annular shoulder, slip members arranged in annular formation within the bowl and provided with flanged heads for reception on the annular shoulder of the said collar, and means between one of the slip members and the bowl for preventing rotation of such slips relative to the bowl.

In testimony whereof, I have signed my name to this specification at Los Angeles, California, this 18th day of May, 1928.

WINFIELD S. JONES.